United States Patent Office 3,258,635
Patented June 28, 1966

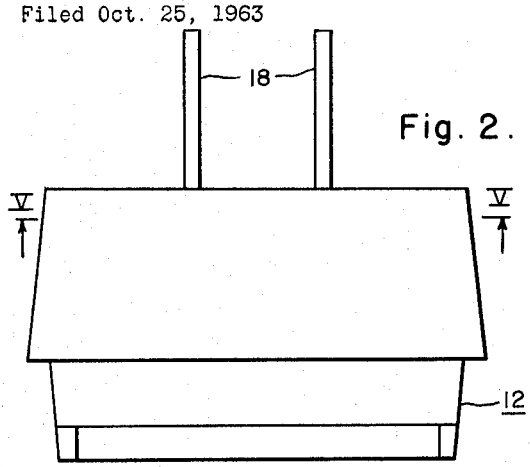
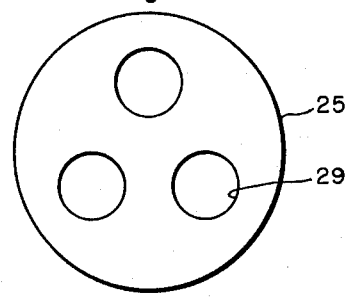
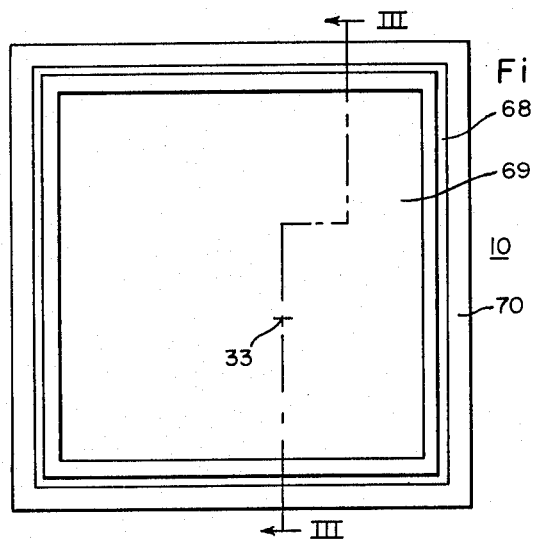
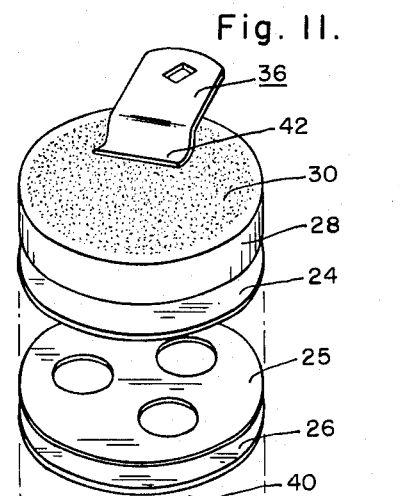
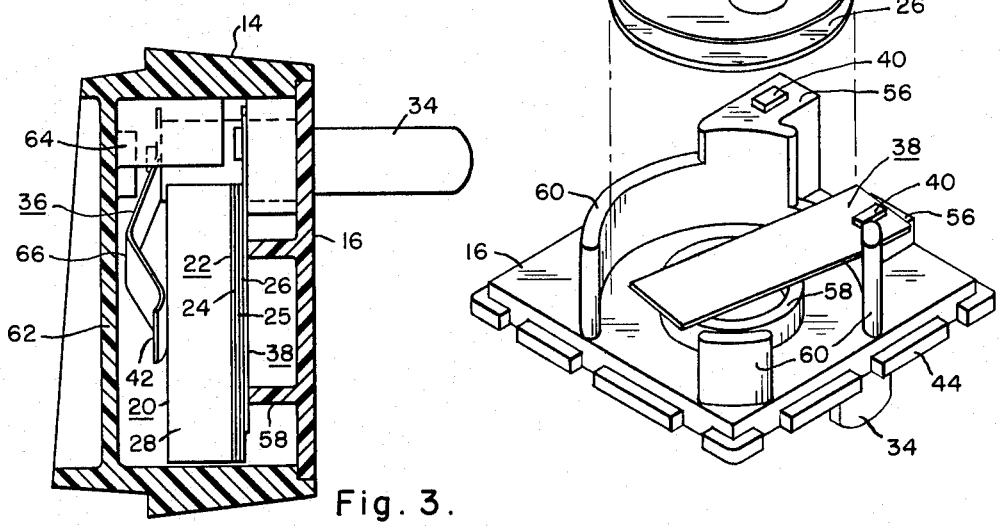

3,258,635
PROTECTOR WIRING DEVICE
Charles H. Carothers and Philip W. Bogner, Bloomington, Ind., assignors to Westinghouse Electric Corporation, Pittsburgh, Pa., a corporation of Pennsylvania
Filed Oct. 25, 1963, Ser. No. 318,872
9 Claims. (Cl. 313—231)

The present invention relates to wiring devices and more particularly to such devices which can be readily connected to household or building wiring systems so as to provide lightning or overvoltage protection for equipment or appliances associated therewith.

One manner in which lightning or overvoltage protection can be substantially provided for household or building wiring systems is through the installation of a suitably rated lightning arrester at the power inlet panelboard or junction of the wiring system. Such installation normally requires a permanent wire connection, and the service and associated cost of a skilled technician is thus usually incurred. When installed at the panelboard, the permanently connected arrester does ordinarily provide protection against direct or induced lightning strokes or other overvoltage surges entering the system upstream from the panelboard and downstream from the next upstream protection point which is usually at the secondary distribution transformer. The arrester also protects against excessive 60 cycle overvoltage by failing or shorting itself to ground the circuit. However, there is still a possibility, though somewhat remote, that a surge can be produced in the downstream household wiring system by electromagnetic or electrostatic induction through the transformer.

In any event, the installation service required for a panelboard arrester represents a marketing disadvantage primarily in relation to existing household structures as contrasted with new construction. A protector or arrester wiring device or plug avoids this marketing disadvantage for it can be readily connected to the usual wall outlets provided in a building or household wiring system. Further, such connections can be made precisely at the point where equipment or appliance protection is desired and the original purchase price of the protector device normally would be comparatively lower.

According to the broad principles of the present invention, a protector wiring device having the described and other advantages in utility comprises an insulative housing in which there are efficiently disposed surge discharge means and with which there are associated conductor or blade means for connection to the wiring system. The conductor means are electrically and preferably resiliently connected to the surge discharge means so as to assure a good surge discharge path from the wiring system to ground.

It is therefore an object of the invention to provide a novel protector wiring device which efficiently provides overvoltage or lightning protection in building or household wiring systems.

A further object of the invention is to provide a novel protector plug which can be readily attached to outlets in a wiring system so as efficiently to provide overvoltage or lightning protection in building or household wiring systems.

Another object of the invention is to provide a novel protector plug which is structurally organized in a compact and durable manner so as efficiently to provide overvoltage or lightning protection in building or household wiring systems.

These and other objects of the invention will become more apparent upon consideration of the following detailed description along with the attached drawings in which:

FIGURE 1 is a top plan view of a protector wiring device constructed in accordance with the principles of the invention;

FIGURE 2 is an elevational view of the protector wiring device shown in FIGURE 1;

FIGURE 3 shows a cross-section of the device taken along the reference line III—III of FIGURE 1;

FIGURE 9 is a top plan view of a spacer employed with a gap assembly in the device of FIGURE 1;

FIGURE 11 is an exploded isometric view of the wiring device shown in FIGURES 1 through 10.

Figure 4:
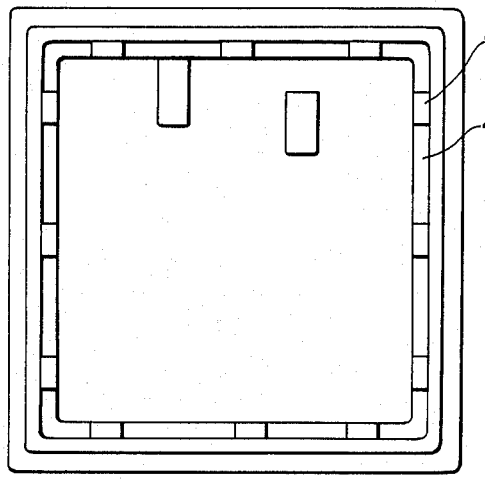
FIGURE 4 is a bottom plan view of a body part of the device of FIGURE 1.

More specifically, there is shown in FIGURES 1 and 2 a protector or lightning arrester wiring device 10 in the form of a plug adapted to attachment to an ordinary outlet in a building or household wiring system. The device 10 will hereinafter be referred to as a plug but it can be provided in other wiring device forms consistently with the broadest aspects of the invention. For example, it can be provided as a receptacle, a combination receptacle-plug, a combination switch-plug, a combination switch-receptacle, etc. Flexible conductors or leads can also be used to allow the device 10 to be connected in circuit relationship. Further, the wiring device or plug 10 can be arranged to provide plural discharge paths therein for plural phase protection.

Structurally, the plug 10 comprises an electrically insulative housing 12 formed from polyvinyl chloride or other insulative material which is preferably self-extinguishing and moldable in character. The housing 12 comprises body and cover parts 14 and 16 (FIG. 3) relative to which there are supported conductor means 18, for example to attach the plug 10 to a wall outlet or the like, and in addition surge discharge means 20 in circuit relationship with the conductor means 18.

The surge discharge means 20 provide a high impedance path to ground at normal system voltages, but provide a good conductive path to ground upon the occurrence of an overvoltage or lightning surge in the system to which the plug 10 is connected. For this purpose, the surge discharge means 20 comprise a gap assembly 22 comprising respective conductive flat plates or discs 24 and 26 formed from brass, for example, and separated by a disc spacer 25 (FIG. 9) which can be formed from any suitable electrically insulative material such as mica or a commercial plastic known as Mylar. The spacer 25 can be provided with one or preferably more openings 29 through which arc current can flow between the plates 24 and 26 when a discharge occurs, see FIG. 11. In this manner, an air gap is provided between the plates 24 and 26 with the removal of a minimum amount of material while adequate strength for the spacer 25 is assured particularly at small diameters and thicknesses (for example 1 inch diameter and .007 inch thickness). In addition, by using several small openings 29 instead of one large opening, the possibility of the air gap being shorted due to the gap plates 24 and 26 being dished is virtually eliminated.

Figure 10:
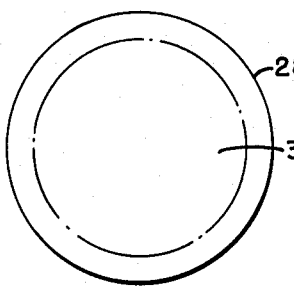
FIGURE 10 shows a top plan view of a valve or block element employed in the device of FIG. 1.

Further, the surge discharge means 20 comprise a valve or block element 28 connected in electrical series with the gap 22 and formed from a material characterized with decreasing resistance as a function of increasing voltage. Such material, for example, can comprise silicon carbide with a suitable binder, such as sodium silicate, suitably compacted together to form the block 28 as a disc-like or other shaped element. Dimensionally, for example, the valve or block 28 can also have a diameter of 1 inch and it can have a thickness of ¼ inch. To improve circuit conductivity, the block 28 can be metallized or aluminumized on one or more of its flat surfaces in a circular pattern as indicated by the reference character 30 in FIGS. 5 and 10, and by stippled area 30 in FIG. 11. The metal surface on the side of the block 28 adjacent to the gap assembly 22 can be used in place of the plate 24 if desired. Further, the plate 26 can be replaced with terminal 38 if desired. The outer circular side of block 28 is preferably coated with some insulating material, such as epoxy, to prevent external flashover of the block 28 while discharging high discharge currents.

The conductor means 18 comprise a pair of blades 32 and 34 having the standard plug-blade spacing therebetween and formed from a conductive metallic material such as brass. The elongated direction of the blades 32 and 34 is disposed substantially in perpendicular relation to the radial direction of the gap assembly 22 and block 28, and the major dimensions of these elements are thus in different planes so as to provide for a compact assembly of the plug 10. Such compactness is achieved in this instance with a relatively small depth for the plug 10 so that when plugged into an outlet it projects outwardly to a relatively minimal extent.

A terminal 36 and the previously noted terminal 38 provide respective contact with the block 28 and the gap plate 26 and are interconnected with the blades 32 and 34. In this case, the terminals 36 and 38 are relatively elongated arms which are mechanically connected to the blades 32 and 34 by staking or other means as indicated by the reference character 40 so as to provide the necessary electric continuity. The blades and arms 32, 36 and 34, 38 can, in other applications of the invention, be provided as respective integral units.

One of the terminals 36 or 38, in this instance the terminal 36, is preferably connected to the surge discharge means 20 by spring means so as to provide for tolerance take-up through resilient mechanical placement of the surge discharge means 20. A reliable electric discharge path is thereby provided through the discharge means 20 between the terminals 36 and 38. In this instance, the spring means are formed by a spring tab 42 on the terminal 36 itself, but in other applications of the invention, the resilient connection can be produced by a separate coil spring or other spring element.

Figure 5:
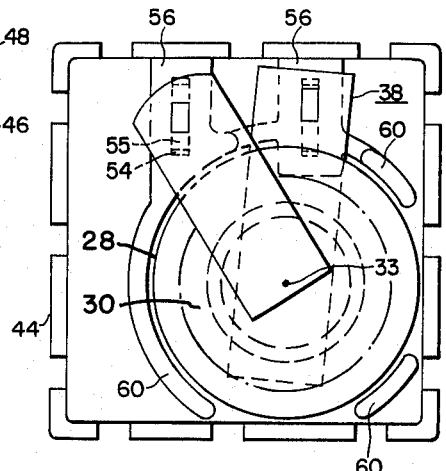
FIGURE 5 shows a section of the device taken along the reference line V—V of FIGURE 2.
Figure 7:
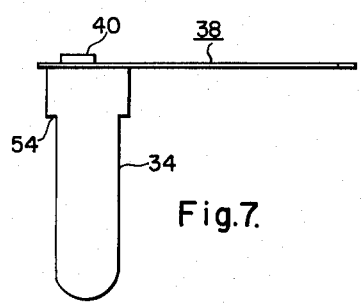
FIGURE 7 is an elevational view of a conductive blade associated with the device of FIG. 1.

The terminal spring tab 42 thus directly contacts the adjacent side of the arrester block 28 and the terminal 38 directly contacts the gap plate 26, and these points of contact are preferably disposed opposite each other as viewed in FIG. 5. A direct discharge path is thus achieved, and for this purpose the extending directions of the terminal 36 and the terminal 38 can be disposed in angular relation to each other in spaced generally parallel reference planes (see FIG. 5) so as to converge upon a common axis as indicated by the reference character 33.

Figure 6:
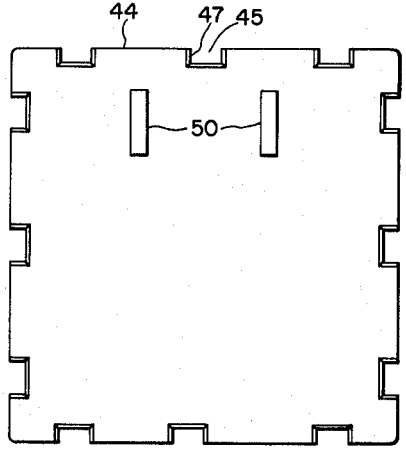
FIGURE 6 shows an outer plan view of a cover part of the device of FIGURE 1.
Figure 8:
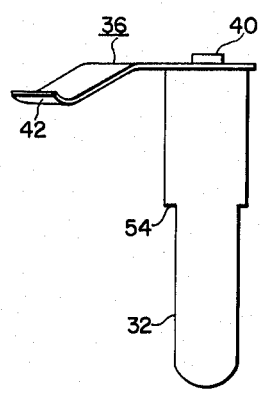
FIGURE 8 is an elevational view of another conductive blade associated with the device of FIGURE 1.

The housing 12 generally supports the conductor means 18 and supports and encloses the surge discharge means 20. In this instance, the cover 16 is provided with a plurality of lugs 44 (FIG. 6) about its perimeter for placement in respective slots 46 disposed between similar lugs 48 on the housing body 14. Preferably, the lugs 44 and 48 are interengaged with a snap fit and cover slots 45 adjacent the cover lugs 44 preferably have outwardly sloped sides 47 to provide for a dovetail or wedge-type joint upon sealing the body and cover lugs 44 and 48 together. In such a joint, the body lugs 48 are deformed to overlie the sloped cover slot sides 47.

A pair of blade slots 50 are provided through the cover 16 and the blades 32 and 34 preferably are inserted therethrough with an interference fit. Shoulders 54 on the blades 32 and 34 abut cover ledges 55 and thereby limit the insertional movement of the blades through the cover slots 50. A pair of posts 56 are disposed on and extend inwardly from the cover 16 about the blade slots 50 to provide added support for the blades 32 and 34 and also to assure adequate insulation and creepage distance between the blades 32 and 34. Inwardly projecting rib means or a circular rib 58 can provide support for the surge discharge means 20 and for this reason the terminal 38 can be disposed immediately thereon with the gap assembly 22 and block 28 disposed on the terminal 38. If desired, ledges 60 can be disposed about the periphery of the surge discharge means 20 to provide support against radial movement of the gap 22 and block 28 (FIGS. 3 and 5). The rib 58 and ledges 60 and posts 56 also provide stiffening action for the cover 16.

The housing body 14 is a generally hollow member to provide space for disposition of the surge discharge means 20 and conductor means 18. A top wall 62 thereof is provided with respective projections 64 which serve as abutments in limiting the extent to which the assembled blades 32 and 34 can be pressed inwardly of the housing cover 16 when inserted in a receptacle or otherwise pressed inwardly. The body wall 62 also limits the extent to which the terminal arm 36 and spring tab 42 can be deflected upwardly as indicated by the reference character 66. The top or front face of the housing body 14 is provided with peripheral ribs 68 which form a recess 69 within which descriptive, trademark and other information can be disposed. The plug front face 70 is thus primarily arranged for appearance purposes as well as handling ease during installation or removal.

To assemble the arrester plug 10, the blade 34 and terminal 38 are first inserted in the appropriate cover slot 50 and the gap 22 and block 28 are then disposed within the ledges 60 and on the terminal 38. The blade 32 is then inserted through the other cover slot 50 with the terminal 36 disposed on the arrester block 28 as previously described. The housing body 14 is then disposed over the entire subassembly and the lugs 48 can be heat sealed, as previously described, to secure the housing parts together as a unit. In the alternative, a suitable fastener or fosteners can be employed to secure the housing parts together as a unit. A suitable chemical seal could also be used to fuse the cover and housing together.

FIG. 11, being an exploded isometric view of the unique device herein disclosed, shows clearly the component parts thereof and their relationship to each other when assembled. Only cover 14 is not shown. With all parts assembled, and in place on base 16 cover 14 is simply placed thereover and secured to the base by the interlocking lugs 44 and slots 46 as described above.

In use, the protector plug 10 can be inserted into an outlet or receptacle to protect downstream equipment or appliances against upstream voltage surges. One significant use is that associated with television sets which are susceptible to voltage surge or lightning damage and at the same time usually involve sufficient investment money to warrant the expense of special proximate lightning or overvoltage protection. In such case, the protector plug 10 can simply be plugged into the duplex wall receptacle in which the television set is plugged. The blades 32 and 34 are then connected to the line and ground wires of the wiring system and excessive voltage or lightning surges are then discharged from the live wire to the ground wire through the surge discharge means 20.

In one sample embodiment of the invention, a protector plug was designed for 120 volt service in protecting television sets and other appliances. The characteristics of this sample were as follows:

Power sparkover voltage___ 800 volts or less R.M.S.
Surge sparkover voltage___ 1500 volts or less on rising wave (1.5 microseconds to peak).
Power follow current about ½ cycle or less of 10 amps. crest_____ Clear at 120 volts.
ASA secondary arrester___ 10,000 amp. surge (max. discharge capacity).

The foregoing description has been presented only to illustrate the principles of the invention. Accordingly, it is desired that the invention be not limited by the embodiments described, but, rather, that it be accorded an interpretation consistent with the scope and spirit of its broad principles.

What is claimed is:

1. A protector wiring device comprising an insulative housing in which there are supported voltage surge discharge means and at least a pair of elongated and generally parallel conductor means accessible for external circuit connection, a major dimension of said discharge means disposed substantially perpendicularly to the elongated dimension of said conductor means, a first elongated terminal arm extending in a direction substantially perpendicular to the elongated dimension of the conductor means connecting one of said conductor means to one contact portion of said discharge means, and a second elongated terminal arm extending in a spaced and generally parallel reference plane to the first terminal arm resiliently connecting the other conductor means to another contact portion of said discharge means through a spring tab integral therewith.

2. A protector wiring device comprising an insulative housing in which there are supported voltage surge discharge means and at least a pair of spaced elongated and generally parallel conductor means accessible for external circuit connection, a major dimension of said discharge means disposed substantially perpendicularly to the extending direction of said conductor means, an elongated terminal arm extending perpendicularly to the extending direction of said conductor means and connecting one of said conductor means to one contact portion of said discharge means, and another elongated terminal arm extending substantially perpendicularly to the extending direction of said conductor means and connecting the other conductor means to another contact portion of said discharge means through a spring tab integral therewith, the extending direction of said terminal arms further disposed at an angle to each other in spaced generally parallel reference planes.

3. A protector wiring device comprising an insulative housing in which there are supported an electrically resistive block and spark gap assembly for discharging voltage surges and at least a pair of spaced elongated and generally parallel conductor means accessible for external circuit connection, a major dimension of said block and gap assembly disposed substantially perpendicularly to the extending direction of said conductor means, said housing having inwardly projecting ledges forming a recess within which said block and gap assembly are supportingly disposed, means connecting one of said conductor means to one contact portion of said block and gap assembly, and means forming an integral part of the other connecting means resiliently engaging another contact portion of said block and gap assembly.

4. A protector wiring device comprising an insulative housing in which there are supported a block and spark gap assembly for discharging surge voltages and at least a pair of spaced elongated and generally parallel conductor means accessible for external circuit connection, an elongated terminal arm connecting one of said conductor means to one contact portion of said block and gap assembly, another elongated terminal arm connecting the other conductor means to another contact portion of said block and gap assembly, said gap formed by two plates with an insulative spacer disposed therebetween and having at least two openings therethrough to form open spaces therein, and spring means for resiliently engaging said other terminal arm with said other contact portion of said block and gap assembly said spring means forming an integral part of the other terminal arm.

5. A protector plug comprising an insulative housing in which there are supported a block and gap assembly for discharging voltage surges and at least a pair of spaced elongated and generally parallel conductive blades projecting outwardly of said housing for connection to an outlet, said housing having body and cover members with said blades projecting through respective slots in said cover member, ledge means projecting inwardly of said cover member and forming a recess within which said block and gap assembly is supportingly disposed, an elongated terminal arm connecting one of said blades to one contact portion of said block and gap assembly, another elongated terminal arm connecting the other blade to another contact portion of said block and gap assembly, and spring means for resiliently engaging said other terminal arm with said other contact portion of said block and gap assembly said spring means forming an integral part of the other terminal arm.

6. A protector plug comprising an insulative housing in which there are supported a block and gap assembly for discharging voltage surges and at least a pair of spaced elongated and generally parallel conductive blades projecting outwardly of said housing for connection to an outlet, said housing having a body and cover members with said blades projecting through respective slots in said cover member, an elongated terminal arm connecting one of said blades to one contact portion of said block and gap assembly, another elongated terminal arm connecting the other blade to another contact portion of said block and gap assembly, a spring tab disposed on said other terminal arm and establishing a resilient contact between said other terminal arm and said other contact portion of said block and gap assembly, a wall of said body member forming a limit of retracting movement of said other terminal arm and spring tab away from said block and gap assembly, and the extending direction of said terminal arms disposed at an angle to each other in spaced generally parallel reference planes.

7. A protector plug as set forth in claim 6, wherein an inwardly projecting rib of said cover member supports said one terminal arm and said block and gap assembly and wherein a post projection inwardly of said cover member surrounds an inner portion of each of said blades.

8. A protector wiring device comprising an insulative housing in which there are supported a block and gap assembly for discharging voltage surges and at least a pair of spaced elongated and generally parallel conductor means accessible for external circuit connection, a major dimension of said block and gap assembly disposed substantially perpendicularly to the extending direction of said conductor means, an elongated terminal arm extending substantially perpendicularly to the extending direction of said conductor means and connecting one of said conductor means to one contact portion of said block and gap assembly, another elongated terminal arm extending substantially perpendicularly to the extending direction of said conductor means and connecting the other conductor means to another contact portion of said block and gap assembly, and spring means resiliently engaging said other terminal arm with said other contact portion of said block and gap assembly, said spring means being formed by a spring tab integral with said other terminal arm, said extending directions of said terminal arms disposed at an angle to each other in spaced generally parallel reference planes.

9. A protector wiring device comprising an insulating housing in which are supported voltage surge discharge means and at least a pair of spaced elongated and generally parallel conductor means accessible for external circuit connection, an elongated terminal arm connecting one of said conductor means to one contact portion of said discharge means, another terminal arm connecting the other conductor means to another contact portion of said discharge means, said terminal arms extending in a direction substantially perpendicular to the elongated dimension of the conductor means, and spring means forming an integral part of the other terminal arm resiliently engaging said other contact portion of said discharge means, said terminal arms extending in directions disposed at an angle to each other in spaced generally parallel reference planes.

References Cited by the Examiner

UNITED STATES PATENTS

| 1,675,637 | 7/1928 | Briggs | 200—130 |
| 2,012,689 | 8/1935 | McFarlin | 339—147 |
| 2,207,160 | 7/1940 | Rivers | 200—130 X |
| 2,889,494 | 6/1959 | Schmidt. | |

FOREIGN PATENTS 525,137   8/1940   Great Britain.

GEORGE N. WESTBY, *Primary Examiner.*

ROBERT SEGAL, *Examiner.*

S. SCHLOSSER, *Assistant Examiner.*